United States Patent [19]
Hafner et al.

[11] Patent Number: 5,893,076
[45] Date of Patent: Apr. 6, 1999

[54] SUPPLIER DRIVEN COMMERCE TRANSACTION PROCESSING SYSTEM AND METHODOLOGY

[75] Inventors: Edward A. Hafner, Dublin; Jay S. Steinberger, Reminderville; Robert C. Humphrey, Shaker Heights; David Gracon, North Olmstead, all of Ohio

[73] Assignee: Sterling Commerce, Inc., Dallas, Tex.

[21] Appl. No.: 586,385

[22] Filed: Jan. 16, 1996

[51] Int. Cl.⁶ .................................................. G06F 17/60
[52] U.S. Cl. ............................................. 705/28; 705/29
[58] Field of Search ................................ 705/7, 10, 28, 705/29, 30

[56] References Cited

U.S. PATENT DOCUMENTS

| | | | |
|---|---|---|---|
| 4,799,156 | 1/1989 | Shavit | 705/26 |
| 4,951,196 | 8/1990 | Jackson | 705/37 |
| 4,972,318 | 11/1990 | Brown | 705/26 |
| 5,128,861 | 7/1992 | Kagami et al. | 705/10 |
| 5,168,445 | 12/1992 | Kawashima et al. | 705/10 |
| 5,202,977 | 4/1993 | Pasetes | 395/500 |
| 5,393,965 | 2/1995 | Bravman | 235/383 |
| 5,410,675 | 4/1995 | Shreve | 395/500 |
| 5,537,313 | 7/1996 | Pirelli | 705/28 |
| 5,608,621 | 3/1997 | Caveney et al. | 705/10 |
| 5,611,051 | 3/1997 | Pirelli | 705/10 |
| 5,638,519 | 6/1997 | Haluska | 705/28 |

OTHER PUBLICATIONS

International Logistics Information System, Received Feb. 1992, Revised May 1992, Sep. 1992, vol. 22, No. 9, pp. 11–19.

Wallace; "BT North America Details Major Net Expansion Plan"; *Network World;* Apr. 27, 1992, p.2; Dialog: File 674, Acc# 022703.

Kelly; "New Partnerships Spur Efficiencies, Reduces Inventory"; *Discount Store News;* v32 n6; p3(2);Mar. 15, 1993; Dialog: File 148, Acc# 06418052.

Bolles; "Enterprise to Enterprise Networking —Advances in Technology Assist Corporations in Forging Strong Business Relationships"; *Network Computing;* 1993; n405; p.88; May 1, 1993; Dialog: File 647, Acc# 00548356.

Copacino; "How to Get With the Program"; *Traffic Management;* v32 n8; p23(2); Aug. 1993; Dialog: File 148, Acc# 06710086.

Vlosky et al.; "Partners: Buyers, Sellers Who Work Together: Electronic Data Systems Let Mills, Wholesalers and Retailers Work Together by Communicating Better to Ensure Consumers Get What They Want"; *Wood Technology;* v121 n3; p51(2); May–Jun. 1994; Dialog: File 148, Acc# 07274635.

Jorgensen; "Vendors Manage Inventory"; *Electronic Buyers' News;* Sep. 6, 1994; p.20; Dialog: File 16, Acc# 05274152.

Andel; "Partnerships with Pull"; *Transportation& Distribution;* v36 n7; p65(4); Jul. 1995; Dialog: File 148, Acc# 08063720.

*Primary Examiner*—Stephen R. Tkacs
*Attorney, Agent, or Firm*—Baker & Botts, L.L.P.

[57] ABSTRACT

A transaction processing system for processing business transactions between a supplier and retailer is provided. The transaction processing system may comprise a retailer processor, a replenishment processor, and a supplier processor. The retailer processor transmits business data from the retailer. The replenishment processor receives the business data and generates suggested business transactions that are communicated to the supplier processor. The supplier processor is operable to selectively modify the suggested business transaction and communicate them to the replenishment processor. The replenishment processor generates actual business transactions.

45 Claims, 5 Drawing Sheets

SUPPLIER DRIVEN COMMERCE TRANSACTION PROCESSING SYSTEM AND METHODOLOGY

TECHNICAL FIELD OF THE INVENTION

The present invention relates generally to the field of automated business, data processing, and data communications applications and more specifically to a system for supplier driven processing of business transactions and interactive communications between a plurality of users within at least one industry including retailers and suppliers.

BACKGROUND OF THE INVENTION

Many retailers are moving towards supplier managed inventory. Retailers who have built a trusting business relationship with their suppliers often do not want to manage their own inventory. An effective means of managing inventory is automated forecasting. Advances in technology have made forecasting technology generally available. However, forecasting technology remains very expensive and often difficult, if not impossible, to implement.

Although existing forecasting schemes have made a substantial positive impact on the ability to manage inventory, they do still suffer from some important drawbacks. For example, an on site forecasting system requires significant on-site resources. Most current inventory management schemes will not allow a supplier to interact with and manage retailer inventory automatically without significant retailer intervention. For example, it is typically not possible for a supplier to create a purchase order for, and to ship and bill inventory associated with that purchase order without input by the retailer.

In addition to requiring an abundance of on-site resources, forecasting can be expensive. A typical application may be beyond the budget of a small or mid-sized retailer or supplier. Similarly, once committed to a forecasting engine both the retailer and the supplier are, to some degree, locked into such a provider. For example, the forecasting engine may become obsolete, perform below expectations, or lack adequate customer support. As will be easily recognizable, this can have a significant negative impact on the subscriber's continuing business operations.

The availability and recent popularity of value added networks provides an attractive alternative to retailer forecasting and inventory management. Many businesses have become dependent on these so-called "distributed" systems for accessing, storing and processing data generated by or required by the business. The components which are accessed from the client (or a dumb terminal) may be part of the businesses' network or they may be components operated by affiliated or unaffiliated third parties. For example, Electronic Data Interchange (EDI) allows businesses to exchange many kinds of data with each other electronically. An electronic network is typically owned and operated by a third party service provider which contracts with the businesses subscribing to the electronic network. In a typical arrangement, both a vendor and a purchaser will subscribe to the electronic network. These parties may exchange electronic mail messages (E-mail), purchase orders, approvals and inventories as well as a myriad of other information through the network. Additionally, various levels of processing may occur within the network so as to automate the business transactions occurring between the vendor and the supplier. These networks are often described as "value added networks" (VANs).

Unfortunately, however, these systems do not provide effective forecasting and replenishment applications. Although VAN's can provide point of sale information, reviewing this information can become overwhelming and manually intensive. Thus, VAN's alone may not be an acceptable solution to inventory management.

Accordingly, a need has arisen for a data processing and data communications system allowing for cost efficient, secure and flexible inventory forecasting and replenishment which may be maintained by suppliers. It is also desirable to provide a system which allows the retailer to monitor the supplier's activity through a direct connection to the server.

SUMMARY OF THE INVENTION

In accordance with the teachings of the present invention, a communications and processing system which substantially eliminates the problems and disadvantages of prior systems is provided.

It is therefore an object of the present invention to provide suppliers with reliable, affordable and efficient means to manage their retailer's inventory which includes access to forecasting based on the retailer's inventory and sales activity and efficient communication and tracking of resultant business transactions.

It is a further object of the present invention to provide this access automatically with a minimum of human intervention.

These and other objects of the present invention will become apparent in connection with the attached drawings and the following description.

The foregoing objects are accomplished in a system providing a communications network which links retailer inventory data, supplier catalog data, forecasting, EDI, and record keeping. In this system, forecasting parameters are maintained by the supplier and a suggested order quantity is generated. Upon receipt of the suggested order, the supplier reviews overall demand and item availability and either approves or modifies the suggested order. This creates an actual purchase order which is transmitted to (but preferably need not be approved by) the retailer. In the event of discrepancies, several control files are created which may be reviewed by the supplier or retailer to update the forecasting parameters.

According to one embodiment of the present invention, a computer system is provided for online processing of business transactions between different types of users including at least one supplier and at least one retailer. The system comprises a retailer processor for transmitting business data from the retailer; a replenishment processor which receives the business data from the retailer processor and generates suggested business transactions; a supplier processor which receives the suggested business transactions from the replenishment processor and selectively modifies and approves the suggested business transactions. The replenishment processor receives the selectively approved and modified business transactions and generates an actual business transaction. In one particular embodiment of the present invention, the retailer is provided with a direct connection to the supplier server to monitor or modify business transactions. Further, a forecasting engine which facilitates creation of suggested business transactions can run either on demand or on a schedule.

BRIEF DESCRIPTION OF THE DRAWINGS

A more complete understanding of the present invention may be acquired by referring to the following description taken in conjunction with the accompanying drawings in which like reference numerals indicate like features and wherein.

DETAILED DESCRIPTION OF THE INVENTION

Figure 1:
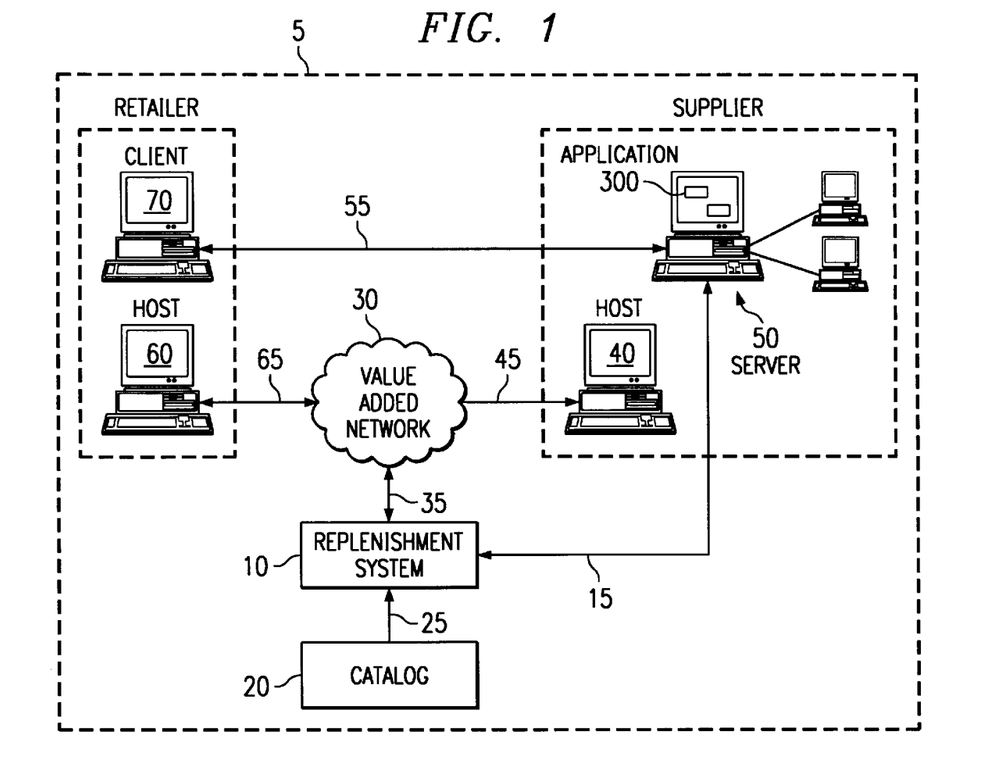
FIG. 1 is a diagram illustrating a generic operational environment of the data processing and data communications system of the present invention.
Figure 2:
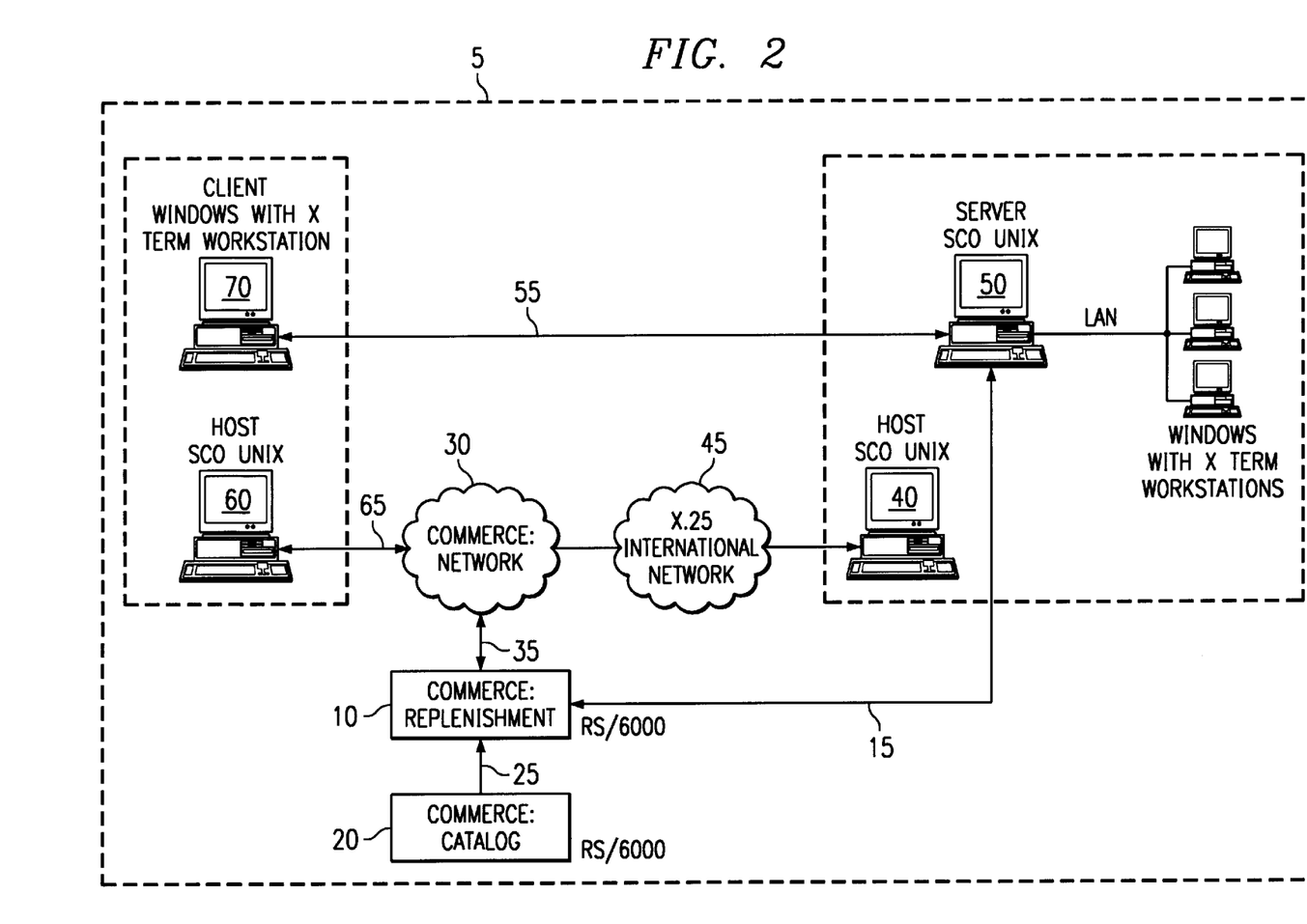
FIG. 2 is a block diagram illustrating a preferred embodiment of the operational environment of the data processing and data communications system of the present invention.

FIG. 1 illustrates a generic operational environment of transaction processing system 5 according to a preferred embodiment of the invention for processing business transactions, while FIG. 2 illustrates a specific and preferred operational environment of transaction processing system 5 according to a preferred embodiment of the invention. The transaction processing system 5 permits suppliers and retailers at remote sites to conduct business transactions and communicate with each other and with data bases from a remote server. Further, transaction processing system 5 allows the supplier to create and approve business transactions based on transaction suggestions developed by replenishment system 10 independent of the retailer.

The following description should be taken in conjunction with FIG. 1 and FIG. 2. It should be noted that like numerals in different figures refer to like structural elements. In a particular embodiment of the present invention, the retailer host 60 may be an IBM compatible PC running Windows with X-Term. Transmission lines 35, 65 may be an X.25 network running UNIX to UNIX Communication Protocol (WUCP) which may be international in physical location or a TCP/IP protocol link comprising an INTERNET connection or a direct connection. Value added network 30 may be, for example, COMMERCE:Network, operated by Sterling Software in Columbus, Ohio. COMMERCE:Network accepts data formatted to electronic data interchange (EDI) standards and makes that data available to clients using different communication hardware devices and software programs . The EDI standard may be, for example, EDIFACT, ANSI X.12 or others. In a particular embodiment, the inventory catalog 20 may be COMNERCE:Catalog, marketed by Sterling Software in Columbus, Ohio, running on an RS/6000 platform. Supplier server 50 and retailer host 60 may be one of various types of remote servers such as a personal computer (e.g. IBM compatible, Apple, etc.) or workstation which may be running various operating systems (e.g. SCO UNIX, DOS, Macintosh, Windows, or Windows95) which may be further distributed to individual remote terminals over a local area network (e.g. Ethernet, etc.), to individual terminals such as dumb terminals, or to a workstation running a terminal program such as Xterm. Value added network 20 may be COMMERCE:Network. Finally, replenishment system 10 may be COMMERCE:Replenishment marketed by Sterling Software in Columbus, Ohio.

Referring to FIG. 1, in a particular embodiment of the present invention, replenishment system 10 receives inventory information from retailer host 60 transmitted over transmission line 65, then formatted by value added network 30 and further transmitted over transmission line 35. In a particular embodiment of the present invention, inventory information may be point of sale data which may be transferred as 852 or 846 EDI document and inventory adjustments or transferred as a 947 EDI document. As is known to one of skill in the art, these numbers represent formats for particular EDI data sets. Point of sale information includes quantities of goods sold and returned, while inventory adjustments include decreases in safety stock and loss of inventory. It should be understood that other inventory and sales related EDI documents and information may also be used. Value added network 30 may provide access to business transactions between trading partners based on a mailbox mechanism. Trading partners can set delivery options through the mailbox mechanism to send and receive in any format and by any means supported by the network.

Replenishment System 10 may also receive information from an inventory catalog 20 via transmission line 25. In a particular embodiment, the inventory catalog 20 may be formulated using COMMERCE:Catalog, marketed by the assignee of this invention. Inventory catalog 20 contains information about a retailer's inventory and each of the items therein such as: price, color, weight, size, velocity, shelf life, etc. Alternatively, catalog information may be entered manually, by batch computer files and programs, or by various other methods while still remaining within the scope of the present invention.

Additionally, replenishment system 10 may receive information via transmission line 15 from supplier server 50 approving suggested business transactions, updating suggested business transaction quantities, or modifying forecasting parameters. In a particular embodiment, transmission line 15 is a direct connection via a modem and a local telephone connection. However, an X.25 network connection or TCP/IP protocol link comprising an Internet connection may also be used.

It should be understood that replenishment system 10 may receive information from sources other than those mentioned above and by communication methods other than those mentioned above. Other sources and methods may be used and still conform to the teachings of this invention.

In a particular embodiment of the present invention, the supplier accesses transaction processing application 300 located on supplier server 50 to approve or modify suggested business transactions. Specifically, the suggested business transactions may be suggested order quantities ("SOQs") along with other transaction related data. Finally, an actual business transaction record is generated by replenishment system 10 and sent to the supplier for record keeping. Specifically, the business transaction record may be a purchase order which may comprise an 850 EDI document sent to and translated by value added network 30, further sent via transmission line 45 and received by the supplier host 40. Transmission line 45 may be an X.25 network connection. Optionally, a duplicate actual business transaction record may be generated by replenishment system 10 and sent to the retailer for record keeping. In this case, the duplicate business transaction record will be sent to the value added network 30, and transmitted to the retailer host 60. A hard copy purchase order or facsimile purchase order may additionally be sent.

In one particular embodiment of the present invention, the retailer accesses the retailer client 70 to monitor and update suggested business transactions which reside on the supplier workstation 50 via transmission line 55. The retailer will have access on retailer client 70 to detailed item shipping information by price, quantity, size, etc. In a preferred embodiment of the present invention, retailer client 70 is one or multiple workstations running an asynchronous modem and Serial XLink manufactured by Hummingbird, located in North York, Ontario, Canada. Specifically, transmission means 55 may be one or multiple TELNET connections.

Figure 3:
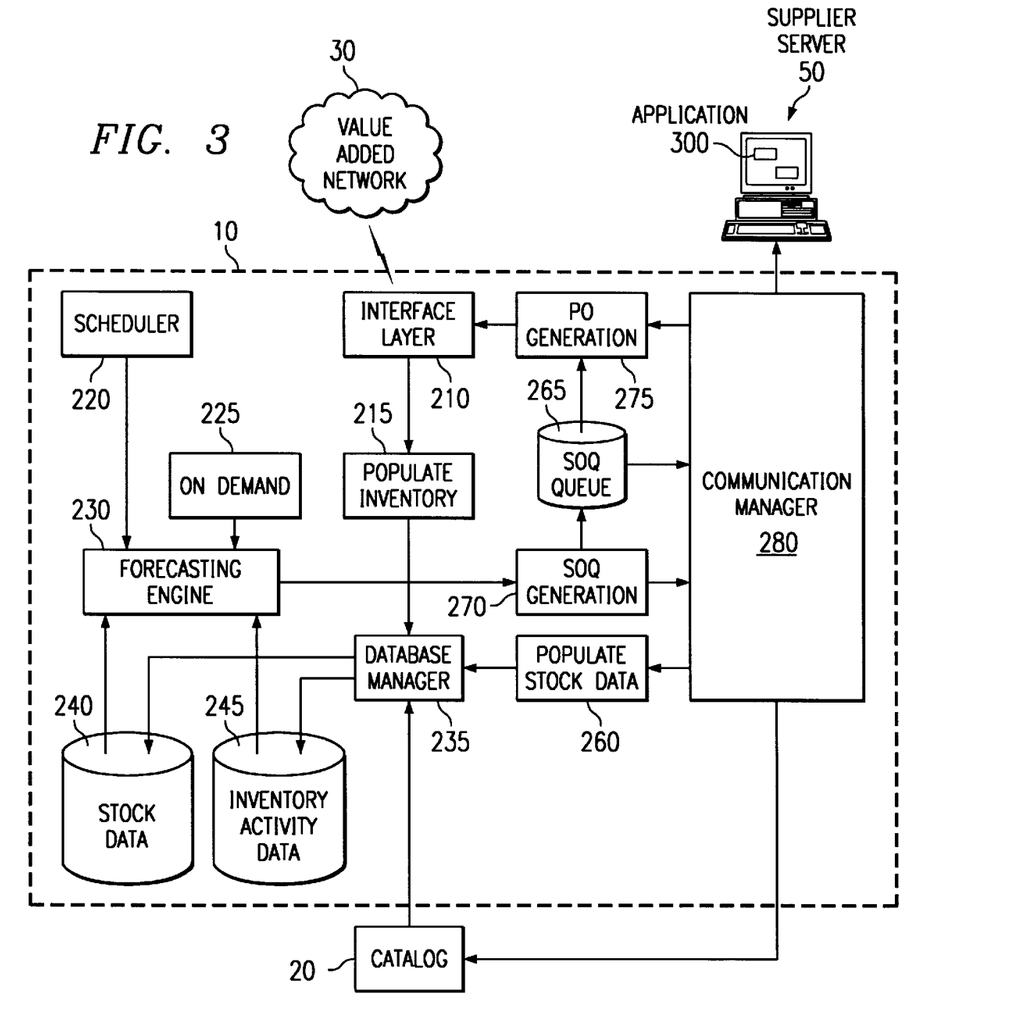
FIG. 3 is a block diagram illustrating the replenishment system of the data processing and data communications system of the present invention.

Referring to FIG. 3, replenishment system 10 of transaction processing system 5 of the present invention is shown in detail. In a preferred embodiment of the invention, a catalog of the supplier's inventory is created. For example, catalog 20 may be used to create catalog file 255. As mentioned above, catalog 20 is preferably COMMERCE:Catalog which is marketed by Sterling Software. To provide a basis for the tracking of inventory information, COMMERCE:Catalog directs database manager 235 to store pertinent inventory information in stock data file 240 and inventory activity file 245. Next, a transmission of inventory adjustment and point of sale information from value added network 30 to replenishment system 10 occurs. Value added network interface 210 receives inventory adjustment and point of sale information from value added network 200. Network interface 210 may be COMMERCE:Network Interface, which is marketed by Sterling Software and which is designed for use with COMMERCE:Network. Network interface 210 transmits inventory adjustment and point of sale information to "populate inventory" function 215. The "populate inventory" function may be, for example, a batch (or online) computer program written in C++ or other programming language which formats point of sale information for storage in inventory activity file 245. This function directs database manager 235 to store the inventory adjustment and point of sale information in inventory activity file 245.

Inventory activity file 245 and stock data file 240 comprise inputs to forecasting engine 230. Specifically, forecasting engine 230 may preferably comprise any forecasting system now known or hereinafter developed. In one embodiment, a neural network forecasting system developed and marketed by Neil Thall, located in Atlanta, Ga. is used. Alternately, various other forecasting engines may be employed in connection with this invention. Assuming updated inventory information is available, forecasting engine 230 predicts future inventory needs based on parameters entered by the supplier, and on information from stock data file 240 and inventory activity file 245. Forecasting engine 230 runs on demand or when requested by scheduler 220. Suggested order quantity generator 270 generates SOQs based on predictions from forecasting engine 230. Suggested order quantity generator 270 may be, for example, a batch (or online) computer program written in C++ or other programming language. Suggested order quantity generator 270 stores the newly generated SOQs in suggested order quantity queue 265 and transmits them to workstation server 290, upon request, via communications manager 280.

According to a preferred embodiment of the present invention, the supplier approves or modifies the suggested order quantities and a message is transmitted to communications manager 280. Alternatively, the approval may be automatic. Communication manager 280 then sends the approval/change to purchase order generator 275. Purchase order generator 275 may be, for example, a batch (or online) computer program written in C++ or other programming language which creates purchase orders based on suggested order quantity queue 265 and the approval/change formulated by supplier and sends them to the value added network 200 via value added network interface 210. The generated purchase order also signals a change in the available stock. A stock update is sent by workstation 290 via communications manager 280 to the populate stock data function 260. Populate stock data function may be, for example, a batch (or online) computer program written in C++ or other programming language which directs the database manager 235 to store stock changes in stock data file 240.

Figure 4:
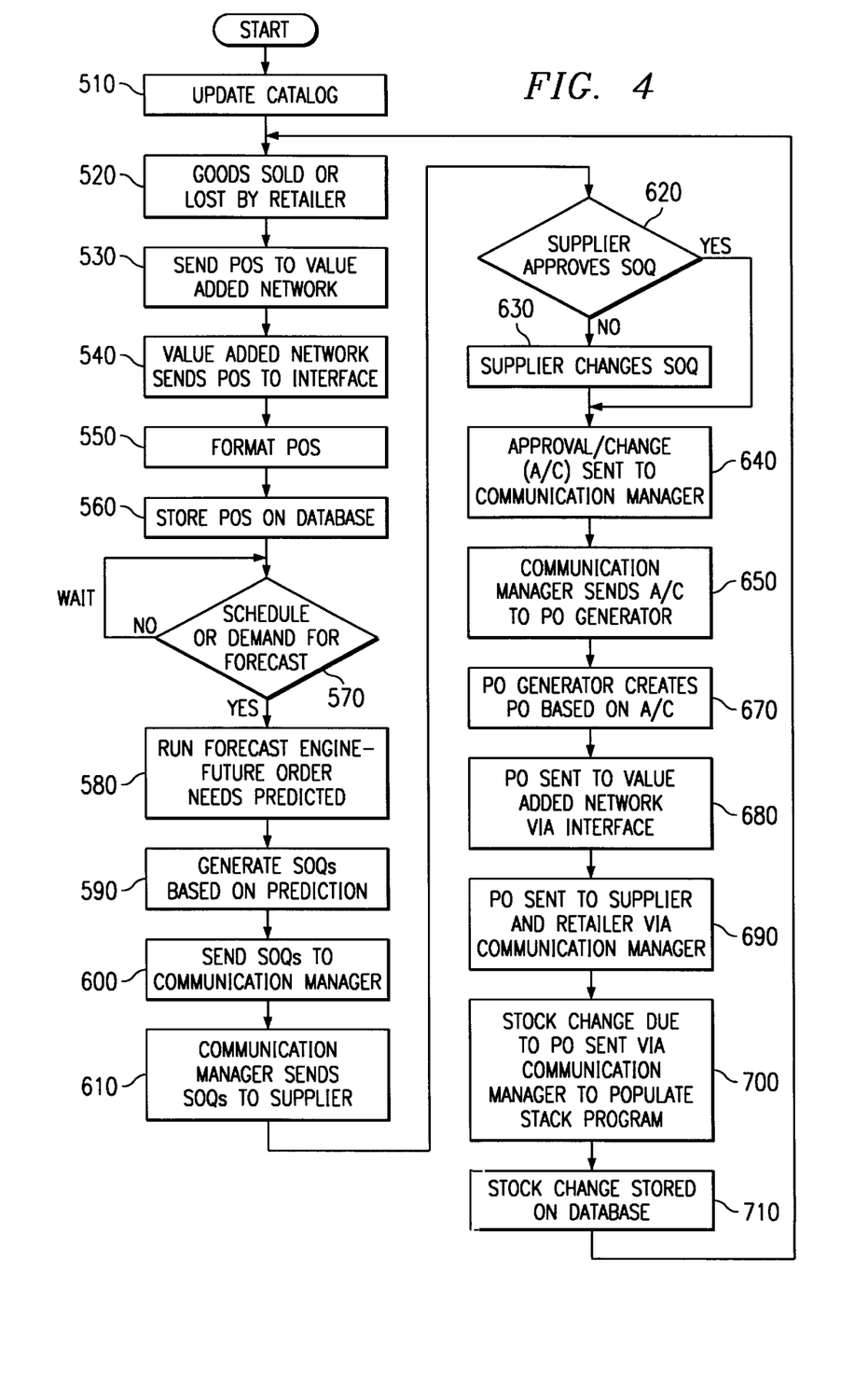
FIG. 4 is a flow chart of the steps performed in the present invention according to a preferred embodiment thereof.

Referring now to FIG. 4, the steps comprising a preferred method according to the present invention are described. First, the supplier updates catalog 20 with the latest items available. Catalog 20 writes this information to catalog file 250 at step 510. Next, the retailer either sells or loses goods at step 520. This activity is recorded and becomes point of sale or inventory adjustment information (POS) at step 530. POS is read by value added network 30, formatted and communicated to value added network interface 210 at step 540. Value added network interface 210 communicates POS to populate inventory function 215 which formats the POS and transmits it to database manager 235 at step 550. Database manager 235 stores the POS in either inventory activity file 245 or stock data file 240, whichever is appropriate, at step 560. Next, either on demand or when scheduled, the forecast engine 230 runs and creates predictions of future needs based on parameters and stock and inventory activity data at step 570. Based on this prediction, SOQ generation function 270 creates SOQs by comparing effective inventory to the order point and communicates these to the supplier server 50 via communications manager 280 at steps 580, 590, 600, and 610. Next, the supplier either approves or changes the SOQ via the replenishment application 300 and confirms the approval or change at steps 620 and 630. This approval/change is communicated via the communications manager 280 to PO generation function 275 at steps 640 and 650. Based on the approval/change and the SOQ file, PO generation function 275 creates POs and communicates them to value added network interface at step 680. The POs are then transmitted by the value added network 30 and transmitted to both the retailer host 60 and the supplier server 50 at step 690. Finally, any changes in stock due to the PO are communicated to populate stock function 260 and formatted and stored in stock data file 240 via database manager 235 at steps 700 and 710.

Figure 5:
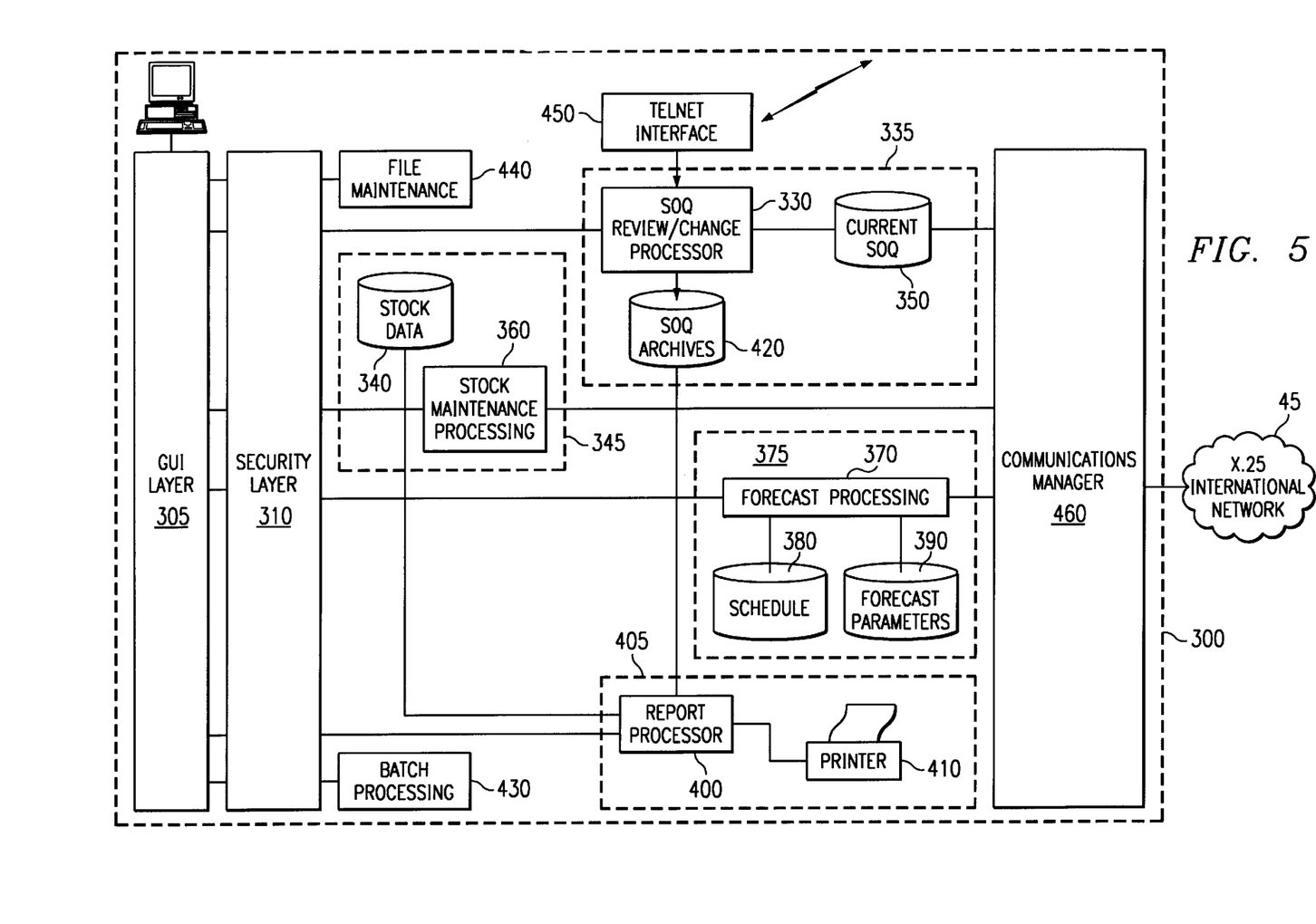
FIG. 5 is a block diagram of the user application residing at the retailer location for the data processing and data communications system of the present invention.

Referring to FIG. 5, user application 300 of transaction processing system 5 of the present invention is shown in detail. User application 300 runs on supplier server 50. Below is a description of displays and functions which are included in a particular embodiment of the present invention. The functions and displays may be implemented using a GUI programming language such as Oracle Forms or Informix 4GL, and a database management system such as Oracle DBMS, Informix, or Sybase. It should be understood that these functions can also be programmed with an object oriented language such as C++, Mosaic, or Visual Basic, or others. It should be understood further that the present invention may run on either a mainframe system such as a UNIX based system or others. The following description can not and does not include all possible displays and functions. Other displays and functions may be provided according to the teachings of the present invention and remain within the scope of the present invention. It should be understood further that functions and displays unique to a particular industry or company may be used and remain within the scope of the claimed invention.

In the preferred embodiment, replenishment application 300 contains at least two separate views into the product, from the standpoint of supplier or retailer driven replenishment. Transaction processing system 5 allows access and modification by both the retailer and supplier. In this embodiment, the user will have access to some or all of the following functions: 1) SOQ review/change sub-system 335; 2) forecasting sub-system 375; 3) file maintenance sub-system 440; 4) communication manager 280; 5) report processing sub-system 410; 6) stock maintenance sub-system; 7) security layer 310; 8) GUI layer 305; and, 9) batch processing sub-system 430.

The following modules run as part of transaction processing application 300:

MAIN MENU

The Main Menu designates the individual modules available within the product and provides access to these modules through the use of point and click on selection boxes, dropdown menu, and function "hot" key.

TELNET INTERFACE 450

Telnet interface 450 provides a communications link as is known in the art for the purpose of allowing Telnet access by the retailer client 70 into the supplier server 50.

GUI INTERFACE 305

GUI interface 305 is provided as the interface to the user. A typical GUI interface will include such operations as go to top of list, go to the bottom of list as well as various locations for data entry, viewing and processing. GUI interfaces, in general, are known in the art.

SECURITY LAYER 310

The Welcome Display/Security

In a particular embodiment of the present invention, security layer 310 is comprised of user ID and password security. Specifically, the welcome display serves as the sign on/security display. It provides for application security by requiring user ID and password. In the supplier view, a scroll area is provided for selection of the customer who's data is to be reviewed. Each customer account has a unique "directory" to ensure file integrity and system security. In the case of remote customer dial-in, in the sign on process the customer automatically routes to the area containing the customer's specific data.

Security Administration (Security File Maintenance)

In addition to the sign on, security layer 310 comprises a security file maintenance function. Application security is provided through the use of option settings controlled by a system administrator in a set of two displays. The system provides the ability to create separate passwords for accessing the operating system and the application. A user number is assigned to each user. This determines which orders are to be accessible. It also defines the level of access provided for order review purposes or access to other system operations. There are two user level definitions inherent in the way user numbers are established. These are: "SUPPLIER", a supplier employee with access rights sufficient to review the order and perform changes, but not necessarily the ability to trigger the purchase order. A "RETAILER", most often a customer employee, is typically provided with the opportunity to review and modify the SOQs, and the ability to approve (release) the purchase order. Security codes for applications may be, for example, N=no access, B=browse, U=update.

SOQ REVIEW/CHANGE SUB-SYSTEM 335

In a particular embodiment of the present invention, the SOQ review/change subsystem 335 is comprised of the following functions: unreviewed orders by review date, SOQ edit/print, SOQ header, SOQ line item, SOQ item detail, order alternate key reset, order split and actual merge, order/vendor/assortment/concession view, order merge selection, order merge processing, order purge, order screening, batch SOQ key resequencing and demand loading. Each of these functions is now described in more detail.

Order Review Main Menu

The SOQ review/change processor 330 provides for the maintenance of orders. It should be understood that functions other than those listed below may be included in the SOQ review/change sub-system 335. The SOQ review/change main menu presents the options available in the SOQ review/change sub-system 335. This sub-system allows the user to review and approve or change the suggested orders. These options are as follows: Bookmark (last SOQ under review), Order Release (previously reviewed orders), Order Consolidation (order merge), File Maintenance (maintain SOQ screening rules), Suggested Order Review (edit—unreviewed orders), and Approved Order Review (edit—reviewed orders).

SOQ Order-Level Display

This function allows review and maintenance of orders created by replenishment system 10, value added network 30, or other sources. This function preferably displays one line for each SOQ (order) header, sorted by order date, supplier, and location. In addition to order number, supplier number and supplier name, it will display location (warehouse) number, order create date, number of items, and order source (Replenishment, Investment, Promo). Any order may be re-designated as an investment or promo order. There are also be a number of supplemental functions available from this display, accessed through, for example, GUI interface 305. A typical GUI interface will include such things as, go to top of list, bottom of list, find a particular order or order date and jump to it, delete an order, perform concession reaching/truck rounding interactively, apply concessions, apply order review filters, or toggle them off, print the edit report and select an order for review.

SOQ Line-Item Display

The function allows maintenance of individual items within an order. This function preferably displays one line for the SOQ header, and one line for each item in the SOQ. SOQ item sort is typically by item number. However, a control file option exists to allow sorting by velocity code, thus placing the "most important" items at the top of the order. Display fields include, but are not be restricted to, item number, deal available flag, description, modified quantity (the Suggested Order Quantity after any changes made by the program to the original SOQ). Modified quantities are typically caused by concession reaching or truck rounding, or minimum and maximum restraints. The retailer normally enters the order from this display by "selecting" the order header, although direct access to SOQ items may be provided.

SOQ Header Display 1

This function of the order header (display # 1) preferably provides supplier name and address information, contact names and phone numbers. The item detail displays are directly accessible from any header display including this one.

SOQ Header Display 2

This function (display #2) displays customer (client) ship-to and bill-to address information as well as miscellaneous shipping data. All fields are open for modification and are written out to a purchase order interface file. As with display 1, direct access to the item detail level is available to the user.

SOQ Header, Display 3

This function displays order total data, preferred concession levels, concession levels achieved, freight and invoice terms, and updatable parameters for online execution of concession reaching and truckload rounding. Terms and delivery data are user-maintainable. Order totals are dynamically updated with changes to suggested order quantities and costs. The retailer will typically view this display immediately prior to going to the detailed item review process and check it again when exiting the order to ensure that the desired ordering plateau has been achieved.

SOQ Item Detail, Display 1

The majority of buying decisions are made through this display. This function displays descriptive data, components of effective inventory, size, pack, and unit of measure data and P.O. costing, each based on unit of sale and extended by SOQ. Extensions are dynamically updated with changes to quantity and cost. Demand history is displayed in either period or weekly format, from a switch set on the vendor file. Other pertinent data relative to the buying decision is also available, including a field for client proprietary information. Forecast-based minimum and maximum (order up to) inventory levels are shown for comparison to demand. The suggested order quantity may be modified by the retailer (or supplier). Purchase order cost may also be changed. An item memo screen indicator provides notification of and access to a display containing client proprietary buying oriented information. Various utilities and means of making use of color graphic representations of data can be used on this and other displays.

SOQ Item Detail, Display 2

This function displays additional information to support the buying decision. Typically, access to this display is required only if a problem is perceived in the data displayed on Display 1. All component parts of the forecast are displayed, as well as any minimum and maximum ordering restraints and various cost data including merchandise and freight costs.

SOQ Item Detail, Display 3

Created dynamically as a result of the existence of a client-coded item memo file record, the purpose of this function is to provide a display for client proprietary data. The user codes an item memo file record (through the use of a maintenance display to be provided), having the same key values as the corresponding item record, with data to be made available in the order review process. A button on Display 1 indicates the presence of, and provides access to, the item memo display. An item memo file maintenance display is to be provided for add, change, and delete of item memo records.

Miscellaneous Order Review Functions

Other online functions may also be included in the SOQ review/change sub-system 335, such as:

1) Order Split—The ability to split selected items out to a separate order;
2) Alternate Buyer—The ability for up to two additional retailers to have access to an order;
3) Truck Rounding—The online rounding of an order up or down to truck weight and cube capacities;
4) Concessions—The online application which adds days of supply to an order in an attempt to achieve desired discount levels;
5) Screening—An online version of a batch program which "pre-approves" SOQs for items based on user-coded criteria. Screened items do not require retailer review but will automatically be included when the order is triggered;
6) FM Access—"Jump to" capability from SOQ review/change displays is provided for access to the maintenance function for screening rules;
7) Order Merge—Combines orders for a single supplier to consolidate orders from multiple sources (Replenishment, Investment, Promo), or orders for various warehouses for cross-dock delivery.

FILE MAINTENANCE SUB-SYSTEM 440

File maintenance sub-system 440 provides for profiles, screening rules (filtering), assortments, descriptions, items, item memo, demand, vendors, defaults, truck configurations, security, and control parameters. Each of these aspects of this sub-system is now discussed.

File Maintenance Main Menu

Selection of any of the options presents a sub-menu of files available for display and modification.

Master File Menu

This menu provides for the display and maintenance of all master files. Maintenance to items and the supplier file, item file and supplier master files on the workstation server will generate batch transactions to be processed by the appropriate processor.

FORECAST PROCESSING SUB-SYSTEM 375

The forecast processing sub-system 375 dictates the operation of forecasting engine 230. An associated menu allows the user to maintain and control the forecasting functions of the system. Functions available from this display are: seasonal profile file maintenance; generate profiles, print profile graph (a batch program trigger to print "hard copy" graphs of specific seasonal profiles); and demand history maintenance. Establishing seasonal profiles is a foundation of the forecasting process and a primary function of this area. Forecast processing 370 runs either on demand or according to a schedule 380 maintained and controlled by the supplier.

Parameter File Menu

The control file discussed above allows a system administrator to manage global system parameters, such as those which control forecasting and replenishment modeling. The default files contain program parameter default values at various levels throughout the system, client level, location, category and class. Access to SOQ filtering (order review screening) is preferably located on this menu. The display provides for the use of a form of intelligent screening of suggested order quantities, allowing for system "pre-approval" when a suggested order meets the specified criteria. If managed properly, this feature can have dramatic effects on retailer efficiency.

Profile File Maintenance

This function allows the user to manually add, change and delete seasonal profiles. Both period and weekly profiles are displayed and maintainable. A change to one set automatically generates changes to the other for the corresponding weeks/periods. The print profile graph function is available from this display. This function can either trigger a batch process to print graphs or display graphics to the display.

Demand File Maintenance

This function allows the user to add, change, and delete demand history file records. The primary purpose is to provide the ability to correct erroneous demand. All demand components are available for modification including, normal, transfer, other, promotional and lost sales. The unusual demand flags and demand loaded flags may also be maintained. Both weekly and period demand is displayed and maintainable. A change to one set automatically creates changes to the corresponding weeks/periods of the other.

COMMUNICATIONS MANAGER 460

In a particular embodiment of the present invention, communications manager 460 includes the network interfaces described below. This sub-system provides an interface between the workstation Server and the network server. This sub-system consists of programs and Unix shell scripts that transfer data and processing requests to/from the network Server. The workstation server system administrator may maintain schedules that cause various events to occur on the workstation server which, in turn, cause processing and subsequent network communications with the network server. In a particular embodiment, the actual data transmissions occur over a X.25 packet switched network.

REPORT PROCESSING SUB-SYSTEM 405

Report processing 405 includes a report processor 400 and a suitable method of spooling jobs to printer 410. Report processor 400 may be a computer program of various types. Printer 400 may be any computer printer compatible with the hardware and software of any particular embodiment.

BATCH PROCESSING SUB-SYSTEM 430

Batch processing 430 exists to process data and perform functions which are too slow, take up too many resources to run on-line, or must run on a schedule. Batch processes may perform some of the functions of other sub-systems.

Backload Demand

This process is used for creating demand history file records, primarily for new client startup. A new client provides sales or demand history in the format of the order detail file records. These in turn are processed through backload demand. If period demand is provided, the corresponding weekly demand records are also generated, along with the period records. The inverse is also true. The client is responsible for the provision of data to be entered into this process. The data must be presented in the format of order detail file records. Optionally, a conversion program can be used to provide the appropriate record format.

Update Weekly Demand

This function takes the order detail file records created by inventory control as input and processes them into the demand history file. This process is similar to the backload demand process although it typically does not include the weekly/period extrapolation feature. As the preceding functional description implies, the execution of inventory control is a prerequisite to running this program.

Seasonal Profile Generator

This process reads the item file in its entirety and, for each profile number found, consolidates demand for all items by profile number. It then preferably uses a Least Squares Linear Regression and Ratio to Trend method to calculate two sets of index values (weekly and period) which define the seasonal pattern for each profile. The results are updated and are stored in the profile file. This process may be executed for all profiles or selectively by profile number. Profile number selection is dependent on records input via an SPG trigger file which is discussed above. An additional product of this program is the creation of the SPG print file, which may subsequently ble used as input to SPG graph, discussed below.

SPG Print

This process prints seasonal profile graphs for all profile numbers contained within the input file. It takes as input the SPG print file containing the profile numbers for which SPG graphs are desired. This file is created by SPG, or, alternatively, it may be manually produced.

Forecast Revision

This process handles creating and updating item forecasts. Forecast revision updates the forecast components in the item file. It then prints a report of exceptions to the "normal" exponential smoothing process, such as period or weekly error trips, fast smoothing, and Least Squares Linear Regression Analysis. It also updates the demand history file (demand loaded flag) and the control file (last forecast revision date).

Item Replenishment

Creates suggested order quantity ("SOQ") files 350 based on the date and cycle coded in the vendor file (cycle-time method) or based on inventory level (OP/EOQ Method). Cycle/time replenishment processes utilize joint replenishment. That is, all items from a vendor are considered during each review. The OP/EOQ process assesses individual items and creates SOQ records based on comparison of the effective inventory to the order point. The process may be executed at any time, depending on need. SOQ files created by replenishment system 10 will be transmitted to the workstation server via X.25.

Batch Item File Maintenance

As the name implies, this process operates on batches of records and performs modifications to the item file on the network server. The input data may be contained in, for example, the ITEMTR File which may be provided via COMMERCE:Network by the supplier or the customer. Add, change, and delete functions are supported.

Batch Vendor File Maintenance

This is the same process as Batch Item File Maintenance process but uses the VENDTR file as input and updates the Vendor File.

SOQ Cleanup

This process purges the SOQ header and item records which have been marked for delete during the SOQ review process. The process also preferably purges all SOQ records, regardless of flag settings. A "network version" flag is also used to discretionarily perform the above-noted modified function. SOQ archive file 420 will be updated at this time.

Batch Screening

This is the batch version of Order Review Screening. This process applies filtering to SOQs created in batch mode.

SOQ File Key Resequencing

The program loads demand history to the SOQ file 350 and builds or rebuilds online forward and backward scrolling keys (alternate indexes).

Inventory Control

The stock maintenance sub-system 345 is responsible for transaction processing, regardless of the origin of the data. The stock maintenance sub-system 345 comprises a stock data filed 340 and stock maintenance processing application, as shown in FIG. 5. Records received on the Network Server are loaded to the ICTRAN File (Inventory Control Transaction File), which is input to this module. Types of transactions processed the stock maintenance sub-system 345 include: invoice; credit memo and transfer; inventory adjustments; inventory overlays; return to vendor, new receipts; receiver changes; and overlay transactions (e.g. committed, back order, on order).

Over/Low Stock Reporting

The network server produces reports for transmission to the workstation server.

RS/6000 Batch Procedures

A number of procedures have been developed to "wrap around" and execute the previously noted programs, some on a standalone basis, and some which comprise logical groupings of multiple batch processes, such as a "daily" or "weekly" procedures. The following batch procedures are provided. These procedures preferably reside on the Replenishment subsystem 10 but are triggered for execution by the workstation server:

Item Batch Maintenance;
Vendor Batch Maintenance;
Backload Demand (for initial demand load and file recovery);
Vendor Demand;
Seasonal Profile Generator (also includes SPG Print);
Seasonal Profile Generator Print;
Forecasting;
Replenishment (also includes Key Resequencing, SOQ Purge, and Screening);
Inventory Control;
Over/Low Stock Reporting;
"Daily" (containing a series of modules);
"Weekly" (containing a series of modules);
"Monthly" (containing a series of modules).

Each procedure will output the appropriate status flags and reports.

EXAMPLE

SOQ/PO Creation and Transmission

The following is the sequence of events which provides for the creation of the SOQ records and purchase order records, and the appropriate manipulation and movement of data.

| Network Server | Supplier Server |
| --- | --- |
| Run SOQ Purge, modified "network" version, to delete SOQ records regardless of scratch flag. This "full" delete will be conditioned on the coding of the "network" switch to be added to the control file. The effect will be to purge ALL existing SOQ records from the Network Server prior to each execution of Replenishment. | |
| Run Replenishment, to create SOQ records. | Call Network Server to retrieve SOQ Files via X.25. |
| | Review SOQs. Modify, delete, and trigger, as required. |
| | Triggering an SOQ calls Create PURORD interactively. Purchase Order records are created. |
| | Transmit Purchase Order records to Network Server via X.25. |
| Receive Purchase Order records. | Run modified SOQ Purge. |

Batch Scheduling System

All regularly scheduled as well as on-demand events (job processing) are triggered from the client system (workstation server).

The above description is merely illustrative of the present invention and should not be considered to limit the scope thereof Additional modifications, substitutions, alterations and other changes may be made to the invention without departing from the spirit and scope thereof as defined by the appended claims.

What is claimed is:

1. A transaction processing system for processing business transactions between a supplier and retailer processor, comprising:

a retailer processor for transmitting business data from said retailer;

a replenishment processor for receiving said business data from said retailer processor, said replenishment processor generating suggested business transactions from said business data;

a supplier processor, said supplier processor receiving said suggested business transactions from said replenishment processor and selectively modifying and approving said suggested business transactions; and said replenishment processor receiving said selectively approved and modified business transactions and generating actual business transactions therefrom.

2. The system of claim 1 further comprising a retailer client processor for monitoring said supplier processor.

3. The system of claim 2 wherein said retailer client processor communicates with said supplier server application via a TELNET connection.

4. The system of claim 1 further comprising a value added network, said value added network communicating with said retailer processor and said replenishment processor and said value added network selectively transmitting said business data and said actual business transactions to said retailer processor and said replenishment processor.

5. The system of claim 4 wherein said replenishment processor comprises:

an interface layer for communicating with said value added network;

an inventory population subprocessor;

a stock population subprocessor;

a forecasting engine, said forecasting engine receiving said business data;

a suggested business transaction generator;

an actual business transaction generator;

a communications manager;

a database manager;

a stock data file and an inventory activity file for storing said business data; and, a suggested order quantity queue for sequentially storing said suggested order quantities.

6. The system of claim 5 wherein said forecasting engine comprises a regression analysis and seasonal forecasting based forecasting engine.

7. The system of claim 5 wherein said forecasting engine comprises a neural network based forecasting engine.

8. The system of claim 5 wherein said forecasting engine runs on a schedule.

9. The system of claim 5 wherein said forecasting engine runs on demand.

10. The system of claim 5 wherein said database manager comprises a relational database manager.

11. The system of claim 5 wherein said database manager comprises a hierarchical database manager.

12. The system of claim 1 wherein said replenishment processor includes a forecasting engine.

13. The system of claim 12 wherein said forecasting engine runs on demand.

14. The system of claim 12 wherein said forecasting engine runs on a schedule.

15. The system of claim 1 wherein said retailer processor communicates with said replenishment processor via an X.25 network connection.

16. The system of claim 1 wherein said retailer processor communicates with said replenishment processor via a direct connection.

17. The system of claim 1 wherein said replenishment processor communicates with said supplier processor via an X.25 network connection.

18. The system of claim 1 wherein said replenishment processor communicates with said supplier processor via a direct connection.

19. The system of claim 1 wherein said business data comprises stock, sales and inventory activity data.

20. The system of claim 1 wherein said suggested business transactions comprise suggested orders.

21. The system of claim 1 wherein said actual business transactions comprise purchase orders.

22. The system of claim 1 wherein said selectively approved and modified business transactions comprise orders.

23. The system of claim 1 wherein said retailer processor receives actual business transactions.

24. The system of claim 1 wherein said supplier processor receives actual business transactions.

25. The system of claim 1 wherein said supplier processor comprises a single server for receiving said actual business transactions and selectively modifying and approving said suggested business transactions.

26. The system of claim 25 wherein said single server is a personal computer.

27. The system of claim 25 wherein said single server is a workstation.

28. The system of claim 1 wherein said supplier server comprises a first server for receiving said actual business transactions and a second server for selectively modifying and approving said suggested business transactions.

29. The system of claim 28 wherein said first server is a personal computer.

30. The system of claim 28 wherein said first server is a workstation.

31. The system of claim 28 wherein said second server is a personal computer.

32. The system of claim 28 wherein said second server is a workstation.

33. The system of claim 1 wherein said supplier processor further comprises processing means for manually selectively modifying and approving said suggested business transactions.

34. The system of claim 1 wherein said supplier processor further comprises a replenishment application.

35. The system of claim 1 wherein said supplier processor comprises:

a suggested business transactions review/change subprocessor;

a file maintenance subprocessor;

a forecast processing subprocessor;

a batch processing subprocessor; and, a communications manager.

36. The system of claim 35 further comprising a TELNET interface, said TELNET interface transmitting to and receiving from said retailer processor.

37. The system of claim 35 further comprising a report processor.

38. The system of claim 35 further comprising a stock maintenance subprocessor.

39. The system of claim 35 further comprising a GUI interface.

40. The system of claim 35 wherein said forecast processing subprocessor comprises seasonal and demand parameter maintenance and scheduling maintenance functions.

41. The system of claim 1 further comprising a catalog system, said catalog system receiving inventory data from said supplier processor and said retailer host application.

42. A method for online processing of business transactions comprising the steps of:

transmitting retailer business data from a retailer processor to a replenishment processor;

forecasting future business transaction quantities;

generating suggested business transactions;

transmitting suggested business transactions to a supplier processor;

selectively approving or modifying said suggested business transactions; and, creating actual business transactions.

43. The method of claim 42 further comprising the step of transmitting said actual business transactions to said supplier server.

44. The method of claim 42 further comprising the step of transmitting said actual business transactions to a retailer server.

45. The method of claim 42 further comprising the step of transmitting stock data changes to said replenishment processor.

* * * * *